United States Patent
Mizuno et al.

(10) Patent No.: US 7,162,576 B2
(45) Date of Patent: Jan. 9, 2007

(54) STORAGE SYSTEM

(75) Inventors: Yoichi Mizuno, Yokohama (JP); Naoto Matsunami, Hayama (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 350 days.

(21) Appl. No.: 10/847,336

(22) Filed: May 18, 2004

(65) Prior Publication Data

US 2005/0210188 A1    Sep. 22, 2005

(30) Foreign Application Priority Data

Mar. 22, 2004    (JP) .............................. 2004-082823

(51) Int. Cl.
*G06F 12/00*    (2006.01)
(52) U.S. Cl. ...................................... 711/112; 711/114
(58) Field of Classification Search ..................... None
See application file for complete search history.

(56) References Cited

U.S. PATENT DOCUMENTS

| | | | |
|---|---|---|---|
| 6,505,257 B1 | 1/2003 | Murata et al. | |
| 6,542,961 B1 | 4/2003 | Matsunami et al. | |
| 6,662,253 B1 | 12/2003 | Gary et al. | |
| 6,842,827 B1 * | 1/2005 | Blankenship et al. | 711/141 |
| 6,941,436 B1 * | 9/2005 | Lee et al. | 711/173 |
| 2002/0126711 A1 * | 9/2002 | Robinett et al. | 370/535 |
| 2004/0143712 A1 * | 7/2004 | Armstrong et al. | 711/152 |

FOREIGN PATENT DOCUMENTS

JP    2003-006174    1/2003

* cited by examiner

*Primary Examiner*—Reginald Bragdon
*Assistant Examiner*—Daniel Vo
(74) *Attorney, Agent, or Firm*—Mattingly, Stanger, Malur & Brundidge, P.C.

(57) ABSTRACT

It is an object to achieve higher performance of input/output processing in a storage system. In a disk controller of a storage system having disk devices and a disk controller that controls input/output of data to/from the disk devices and that accepts requests from a superordinate device, there are provided a memory, a superordinate IF and a subordinate IF (1201), for the exclusive use of each MPU.

7 Claims, 11 Drawing Sheets

FIG.9
(a)
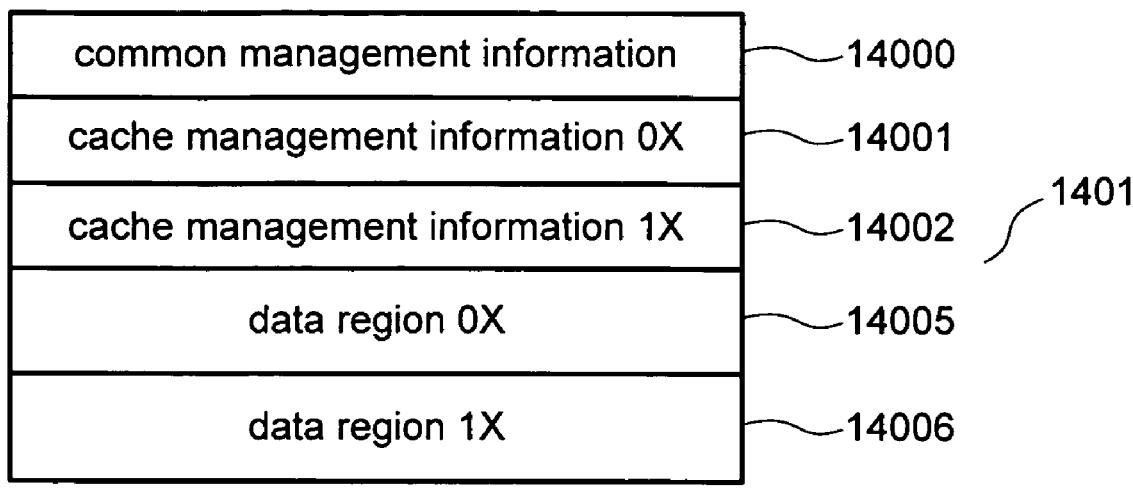
(b)
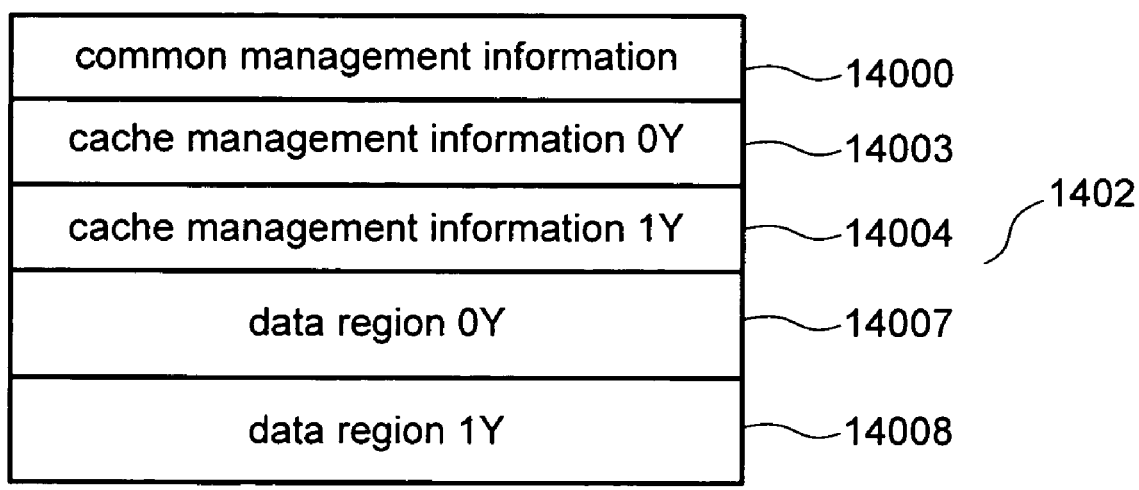

STORAGE SYSTEM

CROSS-REFERENCES TO RELATED APPLICATIONS

This application relates to and claims priority from Japanese Patent Application No. 2004-082823, filed on Mar. 22, 2004, the entire disclosure of which is incorporated herein by reference.

BACKGROUND OF THE INVENTION

The present invention relates to storage system technology; and, in particular, the invention relates to a technique for achieving a high-performance storage system wherein a plurality of processors are incorporated in a controller.

Conventionally, there is a multi-processor construction (for example, see Laid-open Japanese Patent Application No. 2003-006174) employing SMP (symmetric multi-processing) as a means of improving the performance of a computer system. In Laid-open Japanese Patent Application No. 2003-006174, parallel processing is made possible by arranging for a plurality of processors to share computer resources, such as memory.

SUMMARY OF THE INVENTION

Storage systems, typified by disk array devices, are available. Such systems can manage large quantities of electronic data. Improvement of the performance of such storage systems is sought by increasing the speed of data input/output processing. In order to improve the performance of a storage system, application of the SMP technique described in Japanese Patent Application No. 2003-006174 to a storage system disk controller is also being considered.

However, when the technology of Laid-open Japanese Patent Application No. 2003-006174 is applied to a storage system, the following problems arise. Specifically, in the system described in Laid-open Japanese Patent Application No. 2003-006174, the memory that is accessed by the processes is shared. Therefore, in the system described in Laid-open Japanese Patent Application No. 2003-006174, there is the problem that contention occurs in accessing shared memory, when a plurality of processors execute processing, such as data input/output processing.

Also, in the SMP described in the above-referenced Laid-open Japanese Patent Application No. 2003-006174, in order to speed up memory access, each processor has its own cache. In the system of the above-referenced Laid-open Japanese Patent Application No. 2003-006174, synchronization with the data stored in the cache of each processor is performed every time the data of the shared memory is updated. Therefore, in the system of Laid-open Japanese Patent Application No. 2003-006174, an overhead is generated by the processing used to synchronize the data stored in the caches.

Thus, in application of the technology of Laid-open Japanese Patent Application No. 2003-006174, as described above, to a storage system, there is the problem that the performance of the processors cannot be exploited to the maximum.

Even better data input/output processing performance of a storage system is therefore sought.

SUMMARY OF THE INVENTION

As one example, the present invention is applied to a storage system comprising a disk device and a disk controller that receives requests from a superordinate device and has a plurality of processors that control input/output of data with respect to the aforesaid disk device.

The aforesaid disk controller comprises a plurality of memories that store the operating program of the storage system, a plurality of superordinate interfaces that control input/output of data between the superordinate devices, and a plurality of subordinate interfaces that control input/output of data between the disk devices. The memories, the superordinate interfaces and the subordinate interfaces are respectively dedicated for the exclusive use of each processor; and, the plurality of processors respectively execute the operating program by accessing the memories dedicated for their exclusive use, and they perform input/output processing requested from the superordinate devices by controlling these superordinate interfaces and subordinate interfaces that are dedicated for their exclusive use.

Thus, according to the present invention, a plurality of processors are provided in a disk controller that controls the input/output of data with respect to the disk devices, and a dedicated memory, superordinate interface and subordinate interface are provided for each processor. Thus, the plurality of processors execute the input/output processing requested from a superordinate device by executing the operating program by accessing respective memories dedicated for their exclusive use and controlling a superordinate interface and subordinate interface provided for their exclusive use. Thereby, improved performance of data input/output processing of a storage system can be achieved.

BRIEF DESCRIPTION OF THE DRAWINGS

FIGS. 9(a) and 9(b) are diagrams showing an example of the structure of a cache of the third embodiment;

DESCRIPTION OF THE PREFERRED EMBODIMENTS

Storage systems to which embodiments of the present invention are applied will be described below.

<First Embodiment>

First of all, a first embodiment of the present invention will be described.

Figure 1:
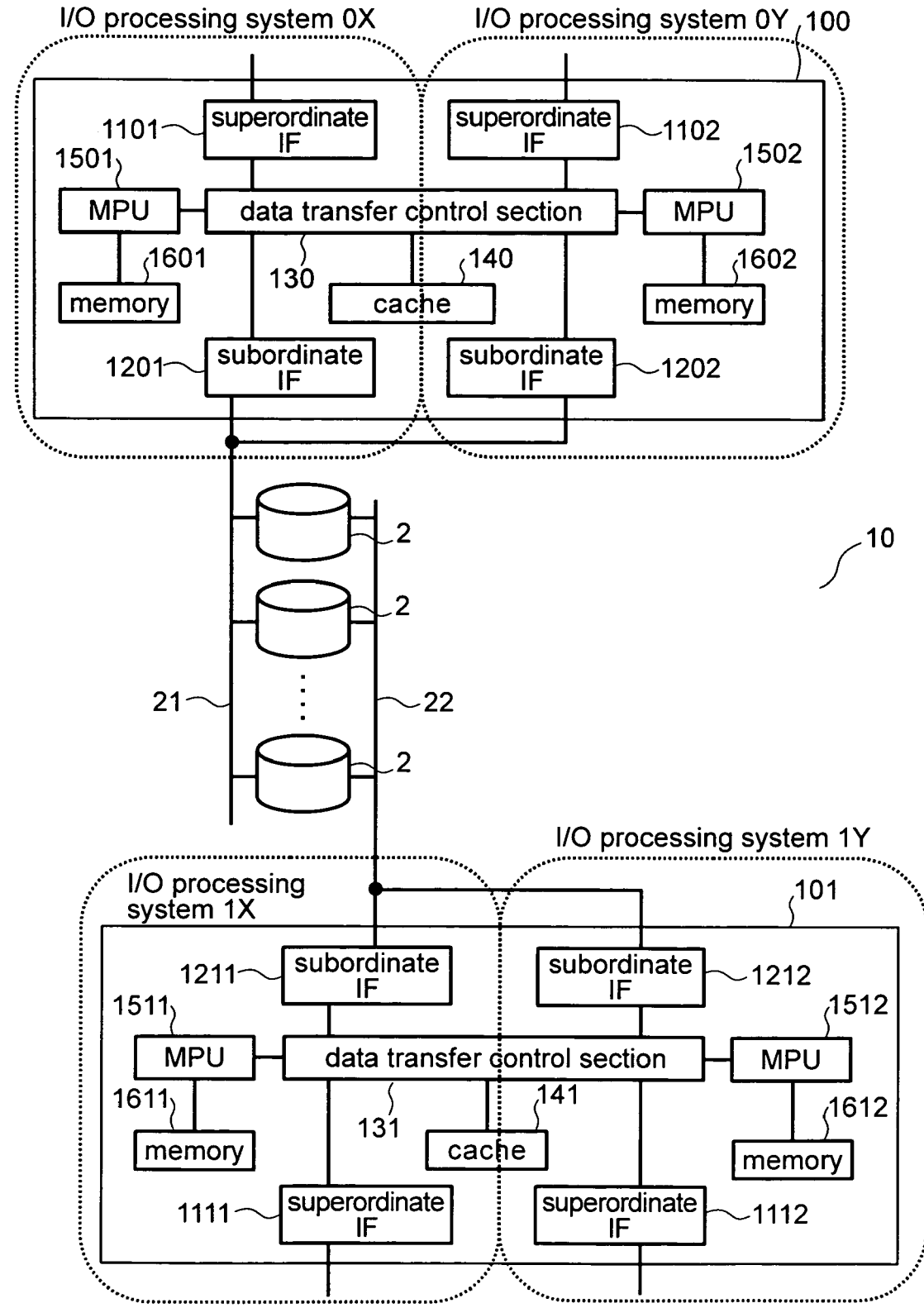
FIG. 1 is a diagrammatic view showing an example of a storage system according to a first embodiment of the present invention.

FIG. 1 is a diagram of a storage system according to a first embodiment of the present invention. As shown in the Figure, the storage system 10 comprises controllers 100 and 101 that control a storage system 10, at least one disk device 2 that stores data transmitted from a host computer (not shown) constituting a superordinate device, and loops (hereinbelow referred to as "back-end loops") 21, 22 that perform transfer of data and that are connected with the controllers 100, 101 and the disk device 2. Although not shown in FIG. 1, the storage system 10 may be connected with a management terminal for input of various types of settings from the user (the management terminal will be described below).

The controller 100 performs input/output processing of data between a host computer and the disk device 2. Specifically, the controller 100 comprises superordinate IFs 1101, 1102, subordinate IFs 1201, 1202, a data transfer control section 130, a cache 140, MPUs (microprocessing units) 1501, 1502 and memories 1601, 1602.

The superordinate IFs 1101, 1102 control input/output of data between the host computer and the controller 100. The subordinate IFs 1201, 1202 perform input/output control of data between the control 100 and the disk device 2. Also, various types of IF, such as a Fibre Channel or SCSI (Small Computer System Interface), SATA (Serial ATA), SAS (Serial Attached SCSI), may be employed for connection between the controllers 100, 101 and the host computer and for connection between the controllers 100, 101 and the disk device 2.

It should be noted that, in the description of this embodiment, the disk device side may be referred to as the "back end". Also, in this embodiment, in order to simplify the description, the superordinate IFs 1101, 1102 and the subordinate IFs 1201, 1202 each have a single port, but this is no more than an example. The superordinate IFs 1101, 1102 and the subordinate IFs 1201, 1202 may be constructed so as to each have a plurality of ports.

The memories 1601 (1602) store various types of information necessary for the control of the storage system 10, such as microprograms executed by the MPUs 1501 (1502) (operating program of the storage system), control information and management information.

The cache 140 stores, for example, data exchanged with the host computer, cache management information that indicates the storage location on the cache 140 of the data exchanged with the host computer, system information of the storage system 10, and shared management information indicating layout information of the disk device 2 (the structure of the data stored in the cache 140 will be described below).

The data transfer control section 130 controls transfer of data stored in the cache 140. The MPU 1501 executes a microprogram stored in the memory 1601 and performs IO processing in accordance with IO processing instructions from the host computer.

In this embodiment, the unit whose construction makes possible the data input/output processing (IO processing) that is performed between the host computer and the storage system 10 will be referred to as the IO processing system. It will be assumed that a single IO processing system is controlled by a dedicated MPU.

In the illustrated embodiment, the controller 100 comprises two IO processing systems, namely, an IO processing system 0X that is controlled by the MPU 1501 and an IO processing system 0Y that is controlled by the MPU 1502.

That is, in this embodiment, the controller 100 comprises plural IO processing systems.

Also, the MPU 1501 of the IO processing system 0X employs the superordinate IF 1101, the subordinate IF 1201 and the memory 1601 as dedicated hardware resources of the MPU 1501. Also, the MPU 1502 of the IO processing system 0Y employs the superordinate IF 1102, the subordinate IF 1202 and the memory 1602 as dedicated hardware resources of the MPU 1502.

Next, the data IO processing performed by the storage system 10 according to this embodiment will be described.

First of all, when the superordinate IF 1101 receives a command from the host computer, the command information is stored at a designated location in the memory 1601 and an interrupt signal is sent to the MPU 1501.

On receipt of this interrupt signal, the MPU 1501 references the memory 1601 and analyses the command information. If the instruction from the host computer is, for example, a read instruction, and if the subject data is present in the cache 140, the MPU 1501 then performs hit read processing. The MPU 1501 stores transfer information indicating the address location of the subject data on the cache 140 in a designated location of the memory 1601 and communicates this transfer information to the superordinate IF 1101.

The superordinate IF 1101 gives instructions for data transfer to the data transfer control section 130 in accordance with the transfer information that has thus been communicated thereto. The data transfer section 130 that has been given these instructions for data transfer reads the subject data from the designated address in the cache 140 and transfers the data to the host computer through the superordinate IF 1101. When transfer of data to the host computer has been completed, the superordinate IF 1101 interrupts the MPU 1501 thereby giving notification of completion of data transfer.

On the other hand, if the subject data is not present on the cache 140, on receiving the read instruction, the MPU 1501 reads the subject data from the disk device 2 through the subordinate IF 1201 and stores the subject data in the cache 140. The subject data that is stored on the cache 140 is transferred into the host computer through the superordinate IF 1101.

If the MPU 1501 has received a write instruction from the host computer, it stores the write data that is sent from the host computer in the cache 140 through the superordinate IF 1101 and then gives a completion report to the host computer. The subject data is then stored in the disk device 2 from the cache 140 through the subordinate IF 1201.

As described above, in IO processing, the MPU 1501 receives interrupts from the superordinate IF 1101 or subordinate IF 1201 and performs reading or writing of the memory 1601. In this embodiment, the hardware resources (superordinate IF 1101, subordinate IF 1201 and memory 1601) are allocated as dedicated hardware resources of the MPU 1501. Consequently, in this embodiment, IO processing can be executed without interference from other MPUs. In the IO processing system 0Y also, interference from other MPUs can be avoided by dedication of the superordinate IF 1102, the subordinate IF 1202 and the memory 1602 in the same way for exclusive use by the MPU 1502.

The controller 101 has the same construction as the controller 100. Specifically, the controller 101 comprises superordinate IFs 1111, 1112, subordinate IFs 1211, 1212, a data transfer control section 131, a cache 141, MPUs 1511, 1512 and memories 1611, 1612.

The controller 101 is constituted as the ensemble of two IO processing systems, namely the IO processing system 1X controlled by the MPU 1511 and the IO processing system 1Y controlled by the MPU 1512.

Also, it will be assumed that the controller 100 and the controller 101 are constituted by the same number of IO processing systems. It should be noted that they could be constituted by any desired number of IO processing systems, so long as the number of IO processing systems of the controller 100 and the controller 101 is the same.

Furthermore, in this embodiment, identical data is stored in the cache 140 and the cache 141, as a defense against the situation where there is a fault in one or other of the controllers, namely, controller 100 and controller 101. The data transfer control section 130 of the controller 100 and the data transfer control section 131 of the controller 101 are connected by a dedicated circuit (not shown). Thus, when the controller 100 or the controller 101 respectively write data to their own cache, they also write identical data to the other cache. With this construction, it is possible to ensure that the data on the cache 140 of the controller 100 will be identical with the data on the cache 141 of the controller 101.

With this construction, for example, if it becomes impossible to access the disk device 2 from the controller 100 due to a fault of the controller 100, "fail over" to the controller 101 can take place. The controller 101 can then continue access using the data on the cache 141.

Next, a logical volume will be described. Ordinary disk regions are recognized from the host computer in units of logical volumes (LU: logical unit). A RAID (Redundant Array Of Independent Disks) group is formed from a plurality of disk devices 2 and a plurality of logical volumes are defined from the RAID group. In addition, in this embodiment, an MPU that is responsible for IO processing of the defined logical volume is set.

Figure 2:
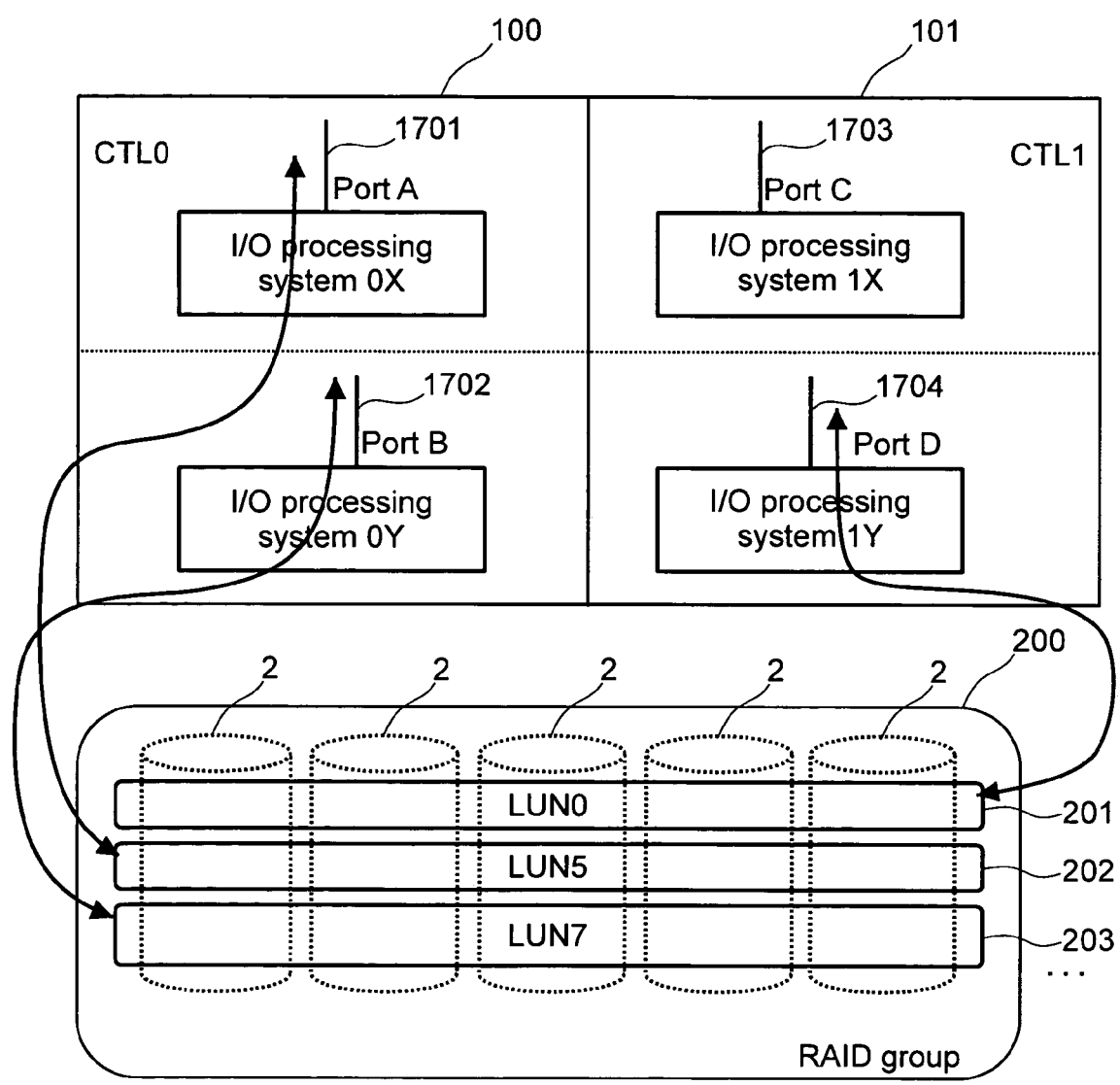
FIG. 2 is a view diagrammatically showing an example of allocation of a logical volume.

Also, the ownership rights of a logical volume are conferred on the MPU that is responsible for IO processing of the logical volume. IO processing for a logical volume is performed by the MPU having the ownership rights of the logical volume. FIG. 2 is a view diagrammatically showing allocation of logical volumes.

As shown in FIG. 2, in this embodiment, a RAID group 200 is formed from a plurality of disk devices 2. Logical volumes 201, 202 and 203 are defined from the RAID group 200.

The logical volumes 201, 202, 203 are managed by an ID (identification symbol) called a "LUN". In the illustrated example, there are three logical volumes, namely, LUN 0, LUN 5 and LUN 7, in the RAID group 200. It should be noted that the number of logical volumes and the size of the logical volumes can be designated at will by the user.

The controller 100 comprises a port A1701 and a port B1702 for connection with a host computer, which not shown. The port A1701 receives input/output of data in respect of the IO processing system 0X. The port B1702 receives input/output of data in respect of the IO processing system 0Y.

The controller 101 comprises a port C1703 and a port D1704 for connection with a host computer, which is not shown. The port D1703 receives input/output of data in respect of the IO processing system 1X. The port D1704 receives input/output of data in respect of the IO processing system 1Y.

Also, in the illustrated example, LUN 5 is allocated to the port A1701 of the IO processing system 0X. This indicates that the MPU 1501 of the IO processing system 0X has the ownership rights of LUN 5. Consequently, MPU 1501 is responsible for IO processing in respect of LUN 5.

Also, LUN 7 is allocated to the port B1702 of the IO processing system 0Y. This indicates that the MPU 1502 of the IO processing system 0Y has the ownership rights of LUN 7. Consequently, MPU 1502 is responsible for the IO processing in respect of LUN 7.

LUN 0 is allocated to the port D1704 of the IO processing system 1Y in the same way. This indicates that the MPU 1512 of the IO processing system 1Y has the ownership rights of LUN 0. Consequently, MPU 1512 is responsible for IO processing in respect of LUN 0.

IO processing in respect of the subject volume can be performed independently by the MPU responsible by determining the MPU that has the ownership rights of the logical volume in this way. Also, in order to make it possible for any MPU to access the disk devices 2, the logical volumes of different responsible MPUs can be mixed in the same RAID group, as in the example of FIG. 2. Also, the ownership rights of a logical volume in the logical volumes in use can be changed over to another MPU. By allocating the logical volume to a port that is desired to be used, a user becomes capable of accessing the subject volume from the port in question.

Figure 3:
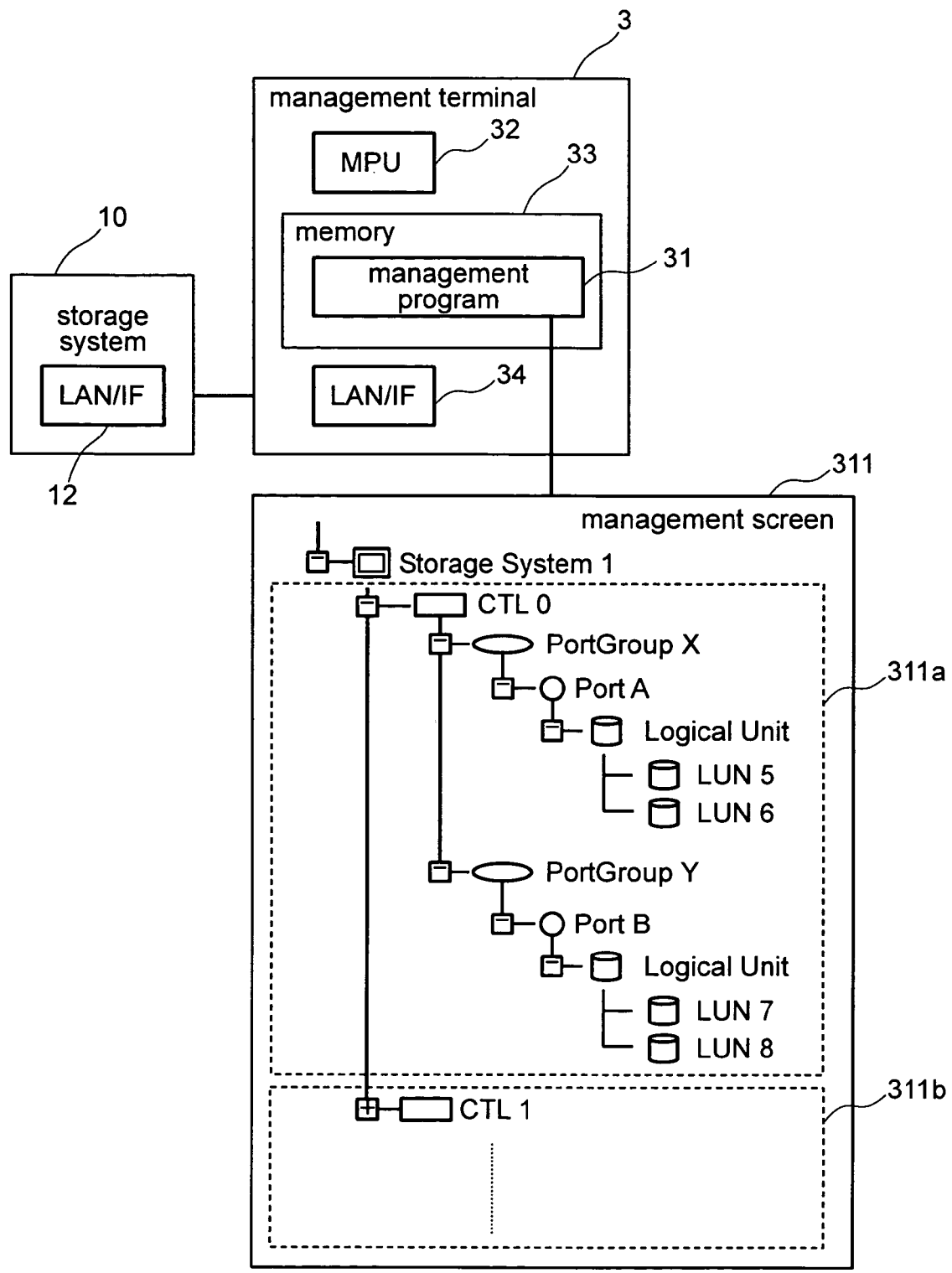
FIG. 3 is a diagram showing an example of a management terminal and management screen.

Next, the management image of the storage system 10 as seen by the user will be described with reference to FIG. 3. FIG. 3 is a view showing an example of a management terminal and a management screen.

In the example illustrated, the management terminal 3 that manages the storage system 10 is connected with the storage system 10 through a network. There is no particular restriction regarding the network used to connect the management terminal 3 and the storage system 10, but in the following description, the case where the network is a LAN (local area network) will be assumed.

In addition to the construction shown in FIG. 1, the storage system 10 comprises a LAN/IF 12 that controls the exchange of data with the management terminal 3. Also, the management terminal 3 comprises an MPU 32, a memory 33 and a LAN/IF 34.

The LAN/IF 34 controls input/output of data with respect to the storage system 10. The memory 33 stores various types of programs (not shown) that control the management terminal 3 and a management program 31 that effects various types of settings in respect of the storage system 10. The MPU 32 executes the various types of programs stored in the memory 33. For example, the MPU 32 executes a management program 31 that is stored in the memory 33, and it performs various types of setting processing, such as setting the logical volumes of the storage system 10 and port allocation.

The management terminal 3 is connected with a display device, which is not shown. The MPU 32 of the management terminal 3 executes the management program 31 and displays a management screen (for example a screen 311) on the display device. The user inputs setting data in respect of the storage system 10 at the management terminal 3 while viewing the management screen. Alternatively, the user confirms the settings of the current state of the storage system 10 while viewing the management screen. The management terminal 3 receives an input of various types of setting data from the user and effects various types of settings in respect of the storage system 10 in accordance with the setting data that is thus received.

Next, the management screen displayed by the terminal device 3 will be described. On the illustrated management screen 311, there are provided an area 311a where the set condition of the controller 100 of the storage system 10 is displayed and an area 311b where the set condition of the controller 101 is displayed. "CTL 0" of the area 311a and "CTL 1" of the area 311b respectively indicate the controllers 100, 101. Also, "ProtGroupX" and "ProtGroupY" subordinate to "CTL 0" of area 311a respectively indicate the IO processing system 0X and the IO processing system 0Y. Also, "PortA" and "PortB" respectively indicate port A1701 and port B1702.

By effecting display in this way, the user can identify the IO processing system as a port group. Also, by effecting display in this way, it can be reported to the user that the two logical volumes LUN 5 and LUN 6 are allocated to the port A17011 and the two logical volumes LUN 7 and LUN 8 are allocated to the port B1702. The user can ascertain which logical volumes can be accessed from each port by viewing the management screen 311.

Also, the management terminal 3 accepts alterations, such as addition or deletion of logical volumes. The management terminal 3 alters the setting of the storage system 10 in accordance with the content of the alteration that it has received. When the setting of the storage system 10 has been altered, the management terminal 3 alters the management screen 311 in accordance with this alteration. For example, if a new LUN 9 is created and LUN 9 is added to the port A1701, LUN 9 will be displayed in addition to LUN 5 and LUN 6 in the column "Logical Units" of "PortA" of the management screen 311 being illustrated.

Figure 4:
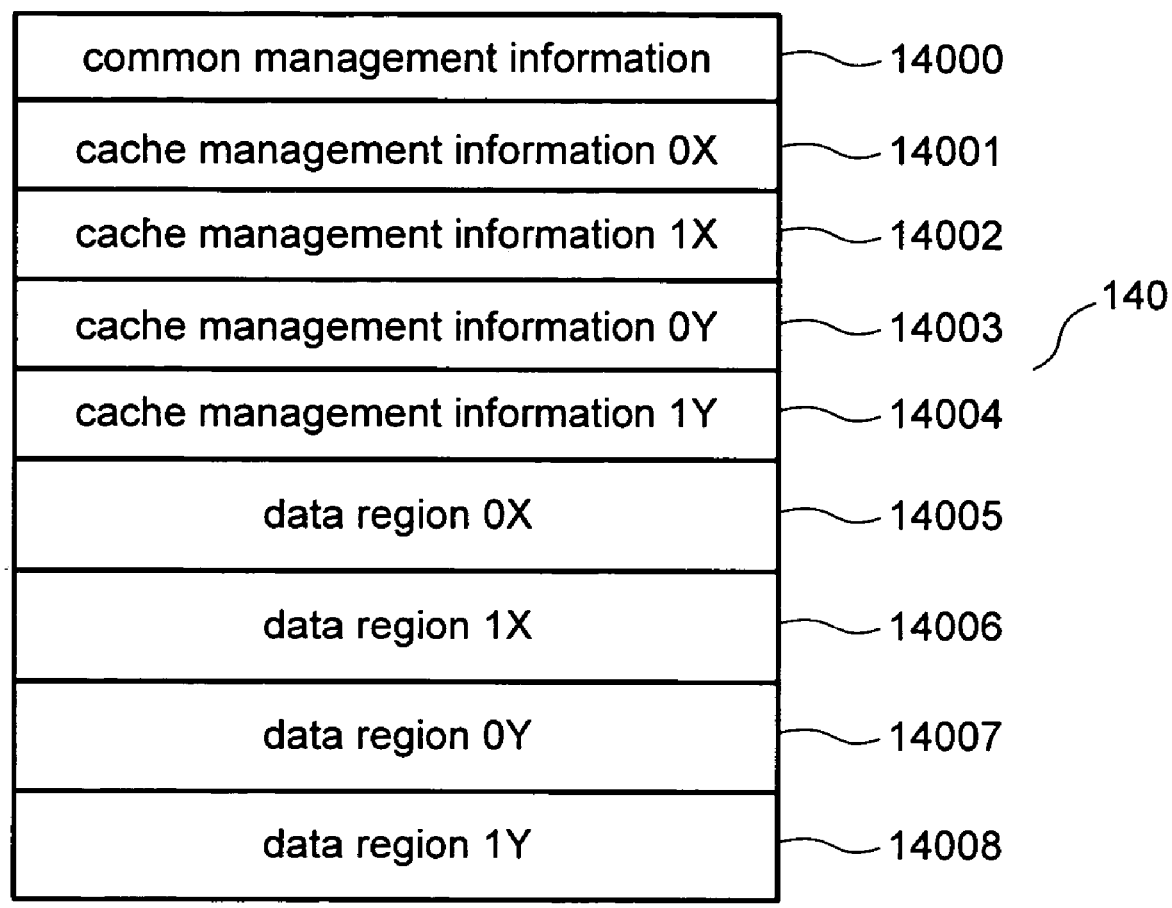
FIG. 4 is a diagram showing an example of the structure of a cache according to a first embodiment.

Next, the structure of the cache 140 of the storage terminal 10 will be described in detail. FIG. 4 is a view showing an example of the cache structure in this embodiment. It should be noted that data identical with the data stored in the cache 140 is mirrored in the cache 141 of the storage terminal 101. The structure of the data stored in the cache 141 and the structure of the data stored in the cache 140 are therefore identical.

The cache 140 is divided into regions 14000 to 14008 in which various types of data are stored.

The region 14000 stores shared management information that is referenced from both MPUs 1501 and 1502. The common management information stored in the region 14000 includes system information of the storage system 10, configuration information of the logical volume that is created on the disk device 2 and ownership rights information indicating, for example, which MPU is responsible for the logical volume.

Both the MPU 1501 and the MPU 1502 can access the cache 140. Consequently, controller 100 need only have a single copy of the shared management information.

The shared resources in the storage system 10 are managed in an integrated fashion by a representative MPU (for example the MPU 1501) and the shared management information is written to the region 14000 so that it can be referenced by the other MPUs. For example, the representative MPU 1501 periodically monitors the back end 21 for insertion or removal of disk devices 2; and, if it finds that the condition of the disk devices 2 has been altered, it records the content of the alteration of the disk devices 2 in the subject table of the shared management information of the region 14000.

The regions 14001, 14002, 14003 and 14004 are regions that store cache management information indicating the data storage information on the cache 140.

The regions 14005, 14006, 14007 and 14008 are data regions that store the data exchanged with the host computer.

The regions that store the cache management information and the data regions are set up beforehand on start-up of the storage system 10.

In this embodiment, regions are allocated on the cache 140 dedicated to exclusive employment by the respective MPUs (1501, 1502, 1511 and 1512). Specifically, the cache management information 14001 and data region 14005 are set up and dedicated for exclusive use by the MPU 1501. The cache management information 14002 and data region 14006 are set up and dedicated for exclusive use by the MPU 1502. Also, the cache management information 14003 and data region 14007 are set up and dedicated for exclusive use by the MPU 1511. The cache management information 14004 and data region 140078 are set up and dedicated for exclusive use by the MPU 1512.

Also, the region that stores the cache management information that is employed by each MPU and the data region are paired. For example, the data arrangement of the data region 14005 that is employed by the MPU 1501 is managed by the cache management information that is stored in the region 14001.

The information regarding arrangement, such as the start address and size on the cache 140, of the cache management information stored in the regions 14001, 14002, 14003 and 14004 and the data stored in the data regions 14005, 14006, 14007 and 14008 is managed by common management information stored in the region 14000.

In this way, in this embodiment, dedicated regions for exclusive use by each MPU are arranged to be set up beforehand in the cache 140. Consequently, in this embodiment, during normal IO processing, exclusive control of the other MPUs in regard to use of the cache region is unnecessary. Each MPU can thus independently implement logical volume IO processing for which it is respectively responsible without needing to be concerned about contention with other MPUs.

However, it should be noted that a need is generated to perform updating of the common management information 14000 that is stored in the region 14000 in cases where the system information of the storage system is altered by, for example, an alteration of system parameters, or in cases where the logical volume configuration information is altered by creation of a logical volume or changeover of the ownership rights.

Such alterations may occur as a result of operations performed by the user at the management terminal 3 or may be performed by the storage system 10 itself due to causes internal to the storage system 10. Thus, when the shared management information that is stored in the region 14000 is updated, exclusive control of the MPU that alters the shared management information that is stored in the region 14000 and the other MPUs is necessary. In this embodiment, there is no particular restriction as to the specific procedure to be employed for exclusive control of the MPUs. For example, to achieve exclusive control, hardware-based exclusive control may be performed using an atomic lock of the data transfer control section 130. Also, for example, a table for use in exclusive control may be prepared in a cache region that can be referenced by each MPU. Software-based exclusive control may then be performed in which, prior to updating of the shared management information stored in the region 14000, access to the shared management information of the region 14000 by another MPU during updating is prohibited by setting a flag in the exclusive control table.

Next, the procedure whereby, when the common management information stored in the region 14000 is updated by the representative MPU, the updated content is communicated to the other MPUs, will be described.

Figure 5:
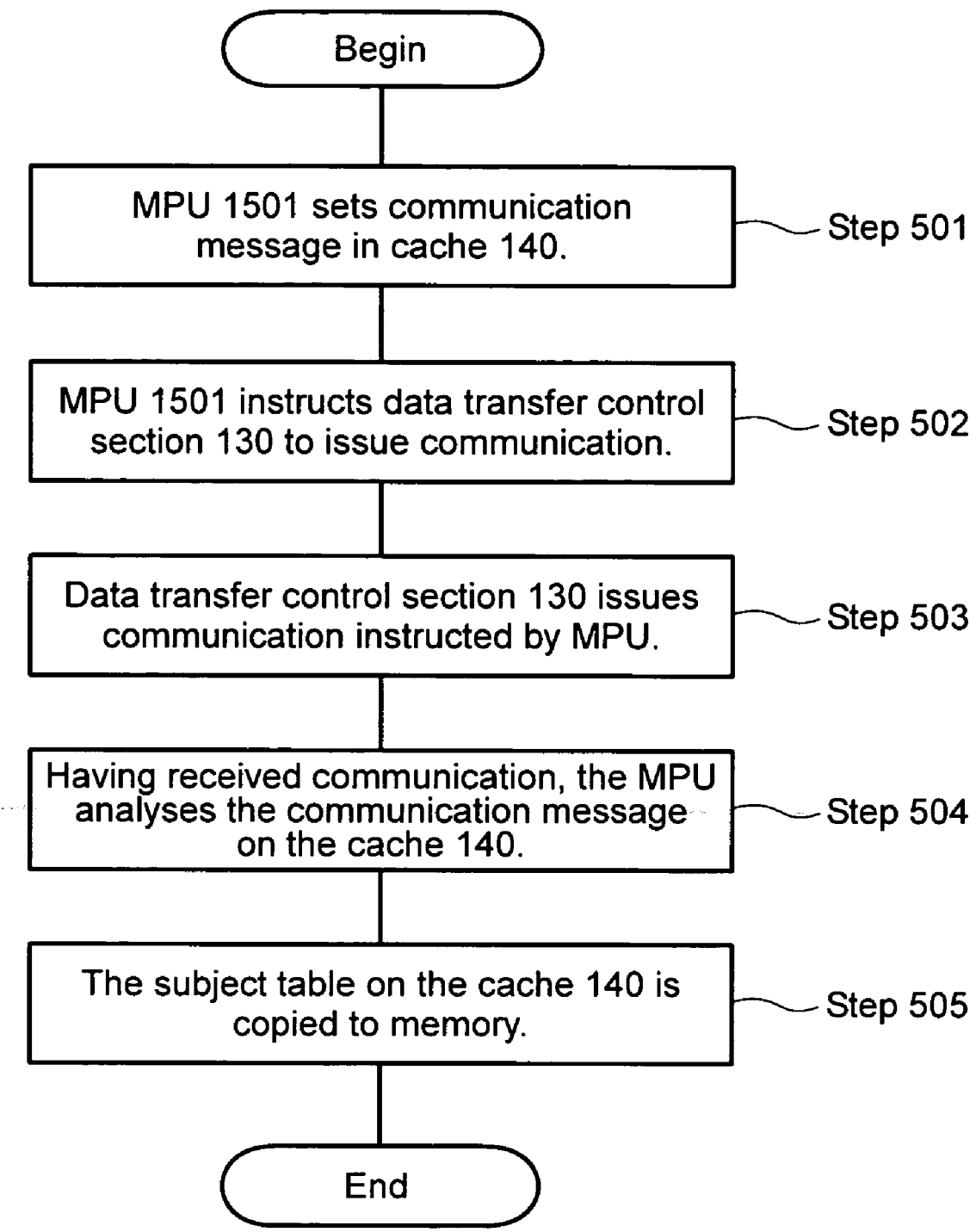
FIG. 5 is a process flow diagram showing an example of communication processing for updating of shared management information performed between MPUs of the first embodiment.

FIG. 5 is a flow diagram showing the flow of communication processing of shared management information updating that is performed between the MPUs in this embodiment. An example will be described in which updating of shared management information is communicated from the MPU 1501 to all of the other MPUs (MPUs 1502, 1511, 1512).

First of all, the MPU 1501 constituting the source of this communication sets a communication message in a predetermined region for communication purposes on the cache 140. A communication message of identical content to that set in the cache 140 is also reflected to the cache 141 by mirroring of the data.

The communication message includes the IDs of the communication source MPU and the communication destination MPUs. Also, it is arranged for the MPU 1501 to identify which data (for example a Table) has been updated by storing the ID of the updated data (for example a Table) or the address on the cache 140 of the updated data (for example a Table) in a predetermined region (step 501).

Next, the MPU 1501 designates the communication destination MPs to the data transfer control section 130 and gives instructions to issue a communication. In this example, all of the other MPUs (MPUs 1502, 1511, 1512) are designated as communication destinations (step 502).

Having received instructions for issue of a communication, the data transfer control section 130 issues a communication to the designated MPUs. In the case of MPUs on the controller 101, communication to the subject MPU is effected from the data transfer control section 130 through the data transfer control section 131 (step 503).

The MPUs that have received a communication from the data transfer control section 130 (or 131) read the predetermined region on the cache 140 or cache 141 and analyze the communication message (step 504).

The MPUs, being made aware of the subject updated data (updated Table) by the communication message, copy the subject data (Table) from the cache to memory and the updated content is thereby reflected to the memories 1601, 1602 of the MPUs (step 505).

In this way, in this embodiment, communication of configuration updates between the MPUs can be performed. For example, in the case of a changeover of ownership rights of a logical volume, the MPU constituting the source of the changeover alters the ownership rights information of the logical volume that is the subject of the shared management information of the region 14000 and the arrangement information of the cache 140 of the subject logical volume, from the MPU constituting the source of the changeover to the MPU constituting the destination of the changeover. Implementation of a changeover of ownership rights can thus be achieved by communicating the data storage location that has been altered by the changeover source MPU to the changeover destination MPU and the other MPUs.

<Second Embodiment>

A second embodiment of the present invention will be described. In this second embodiment, a construction for expanding the bandwidth of the back-end loop is added to the construction of the storage system 10 of the first embodiment. In the description of the second embodiment, items which are the same as those described in the case of the first embodiment are given the same reference symbols.

The storage system 10 according to the second embodiment is configured such that the bandwidth of the back end can be set in a back-end shared mode (hereinbelow referred to as the "standard mode") and a back-end non-shared mode (hereinbelow referred to as an "expanded bandwidth mode").

As shown in FIG. 1, the standard mode is a configuration in which disk devices 2 are connected to the back-end loops 21, 22. Specifically, as shown in FIG. 1, the subordinate IFs 1201, 1202 of the controller 100 are connected to a single back-end loop 21. The subordinate IFs 1211, 1212 of the controller 101 are connected with a single back-end loop 22. The disk devices 2 are respectively connected with the two loops 21, 22. That is, in the "standard mode", a bandwidth corresponding to a total of two loops is available.

Thus, by adopting such a configuration, in the "standard mode", access can be achieved to all of the disk devices 2 from the subordinate IFs (1201, 1202, 1211 and 1212) provided in the controllers 100, 101.

Figure 6:
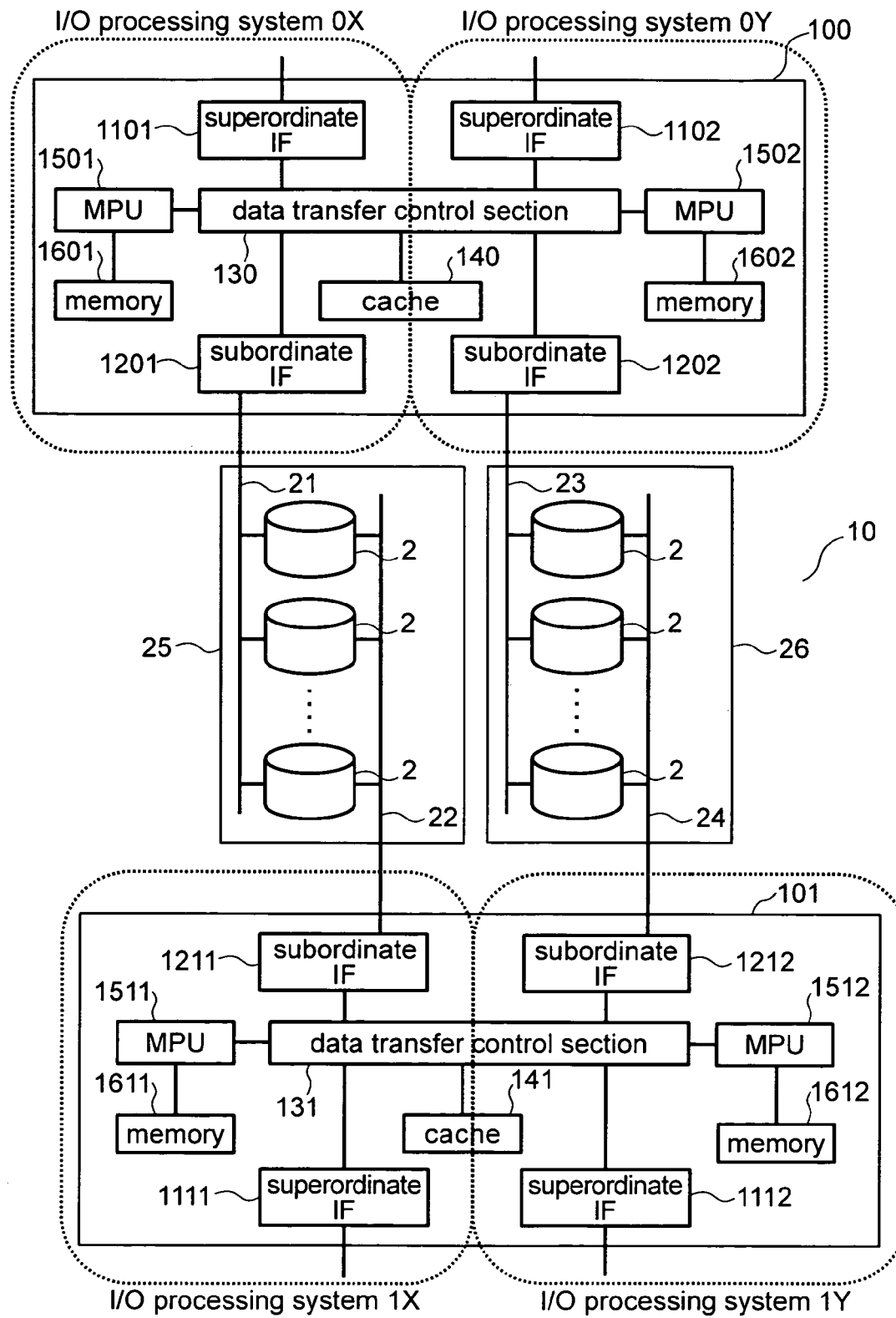
FIG. 6 is a diagrammatic view showing an example of the structure of a storage system according to a second embodiment of the present invention, that is set up in expanded bandwidth mode.

The "expanded bandwidth mode" involves a back-end configuration in which the disk devices that can effect access are separately assigned to each IO processing system. A specific description of the "expanded bandwidth mode" will be given below with reference to FIG. 6. FIG. 6 is a view showing the configuration of a storage system that is set up in the expanded bandwidth mode.

In the expanded bandwidth mode, the disk devices 2 are classified into a group that is connected with the IO processing system X and a group that is connected with the IO processing system Y. In the example illustrated, the disk devices 2 that are classified in the X system are accommodated in the X system drive cabinet 25. The disk devices 2 that are classified in the Y system are accommodated in the wire system drive cabinet 26.

The disk devices 2 that are accommodated in the X system drive cabinet 25 are connected by back-end loops 21 and 22. Also, the disk devices that are accommodated in the Y system drive cabinet 26 are connected by the back-end loops 23 and 24.

It should be noted that, in the description of the second embodiment, although the disk devices 2 of the group that is connected with the X system and the disk devices 2 of the group that is connected with the Y system are accommodated in separate drive cabinets, there is no particular restriction to this. So long as the disk devices 2 of the group that is connected with the X system and the disk devices 2 of the group that is connected with the Y system are connected with separate back-end loops in each group, they may be accommodated in the same drive cabinet. Also, the disk devices 2 need not be accommodated in drive cabinets.

The subordinate IF 1201 of the IO processing system X of the controller 100 is connected with the back-end loop 21 which connects the disk devices 2 that are accommodated in the X system drive cabinet 25. The subordinate IF 1211 of the IO processing system X of the controller 101 is connected with the back-end loop 22 that connects the disk devices 2 that are accommodated in the X system drive cabinet 25.

Also, the subordinate IF 1202 of the IO processing system Y of the controller 100 is connected with the back-end loop 23 that connects the disk devices 2 that are accommodated in the Y system drive cabinet 26. The subordinate IF 1212 of the IO processing system Y of the controller 101 is connected with the back-end loop 24 that connects the disk devices 2 that are accommodated in the Y system drive cabinet 26.

Thus, when the storage system 10 is set to "expanded bandwidth mode", the back-end loops that are capable of being accessed from the controller 100 are two back-end loops, namely, the back-end loop 21 and the back-end loop 23. Also, only the subordinate IF 1201 can access the disk devices 2 that are classified in the X system through the back-end loop 21. And, only the subordinate IF 1202 can access the disk devices 2 that are classified in the Y system through the back-end loop 23.

Likewise, when the storage system 10 is set to "expanded bandwidth mode", the back-end loops that can be accessed from the controller 101 are two, namely, the back-end loop 22 and the back-end loop 24. Also, only the subordinate IF 1211 can access the disk devices 2 that are classified in the X system through the back-end loop 22. And, only the subordinate IF 1212 can access the disk devices 2 that are classified in the Y system through the back-end loop 24.

In this way, when "expanded bandwidth mode" is set, the storage system 10 has a total of four back ends i.e. the loop bandwidth is expanded compared with the "standard mode".

Next, the management of the disk devices 2 that is performed by the controller 100 will be described for the case where the storage system 10 is set to "expanded bandwidth mode".

In the "standard mode" of the storage system 10, a single representative MPU is set, and the representative MPU (for example MPU 1501) is arranged to perform management of all of the disk devices 20 provided in the storage system 10.

In contrast, when the storage system 10 is in the "expanded bandwidth mode", a representative MPU is set for each of the respective IO processing systems (each of the X systems and each of the Y systems). For example, it is arranged that the management of the disk devices 2 that are classified in the X system (in the case of the example of FIG. 6, the disk device 2 of the drive cabinet 25) should be performed by the MPU 1501 and that the management of the disk devices 2 that are classified in the Y system (in the case of the example of FIG. 6, the disk device 2 of the drive cabinet 26) should be performed by the MPU 1502.

Also, in the second embodiment, the IO processing system 0X that is controlled by the MPU 1501 of the controller 100 and the IO processing system 1X that is controlled by the MPU 1511 of the controller 101 are arranged to be capable of being accessed by the same disk device 2. Likewise, the IO processing system 0Y that is processed by the MPU 1502 of the controller 100 and the IO processing system 1Y that is processed by the MPU 1512 of the controller 101 are arranged to be capable of being accessed by the same disk device 2.

By adoption of such an arrangement, even when the storage system 10 is in the "expanded bandwidth mode", it is possible to cope with a controller fault when one or the other of the controllers 100 and 101 malfunctions.

It should be noted that, in the second embodiment, the disk devices 2 that can be accessed from each MPU are each of the disk devices classified in the X system and each of the disk devices 2 classified in the Y system. Consequently, in the second embodiment, the configuration of a RAID group including more than one system is prohibited, and a RAID group can be set up only within the same system. The location of the disk devices 2 constituting a RAID group can be freely chosen, so long as these disk devices are within the same system.

In addition, in the second embodiment, regarding setting of the ownership rights of an MPU, an MPU can only be designated as belonging to a system that can access disk devices 2 constituting the subject logical volume. For example, in the case of a logical volume classified in the X system, setting is restricted such that only the MPU 1501 or MPU 1511 can have ownership rights.

Also, in the case where access of a logical volume constituted by disk devices 2 classified in the Y system is performed from the MPU 1501 (or the MPU 1511), access is achieved as follows. The MPU 1501 (MPU 1511) accesses a logical volume of the Y system by requesting the MPU that has the ownership rights of the subject logical volume to perform IO processing of a disk device 2 through the cache 140 (cache 141). Likewise, access from the MPU 1502 or MPU 1512 to a logical volume of the X system group is performed by likewise making a request to the MPU having ownership rights thereto.

Next, the procedure that is used when changing over the storage system 10 from "standard mode" to "expanded bandwidth mode" will be described. In the following description, the case where a Y system drive cabinet 26, in which a plurality of disk devices 2 are accommodated, is newly added to the layout of the storage system 10 shown in FIG. 1 will be described by way of example.

When "expanded bandwidth mode" is set, as shown in FIG. 6, the user connects the X system drive cabinet 25 and the Y system drive cabinet 26 to the controllers 100, 101 separately.

Specifically, the user disconnects the connection of the subordinate IF 1202 and the back-end loop 21 of the controller 100 (see FIG. 1). Likewise, the user disconnects the connection of the subordinate IF 1212 and the back-end loop 22 of the controller 101 (see FIG. 1). The user then newly connects the back-end loops 23, 24 that are connected with the disk devices 2 of the Y system drive cabinet 26 that has been prepared with the subordinate IFs 1202, 1212 (see FIG. 6).

After this, the user notifies the storage system 10 of an intention to start up in the "expanded bandwidth mode" by operating the management terminal 3. When the storage system 10 has received this notification, it changes over its own settings to "expanded bandwidth mode".

Figure 7:
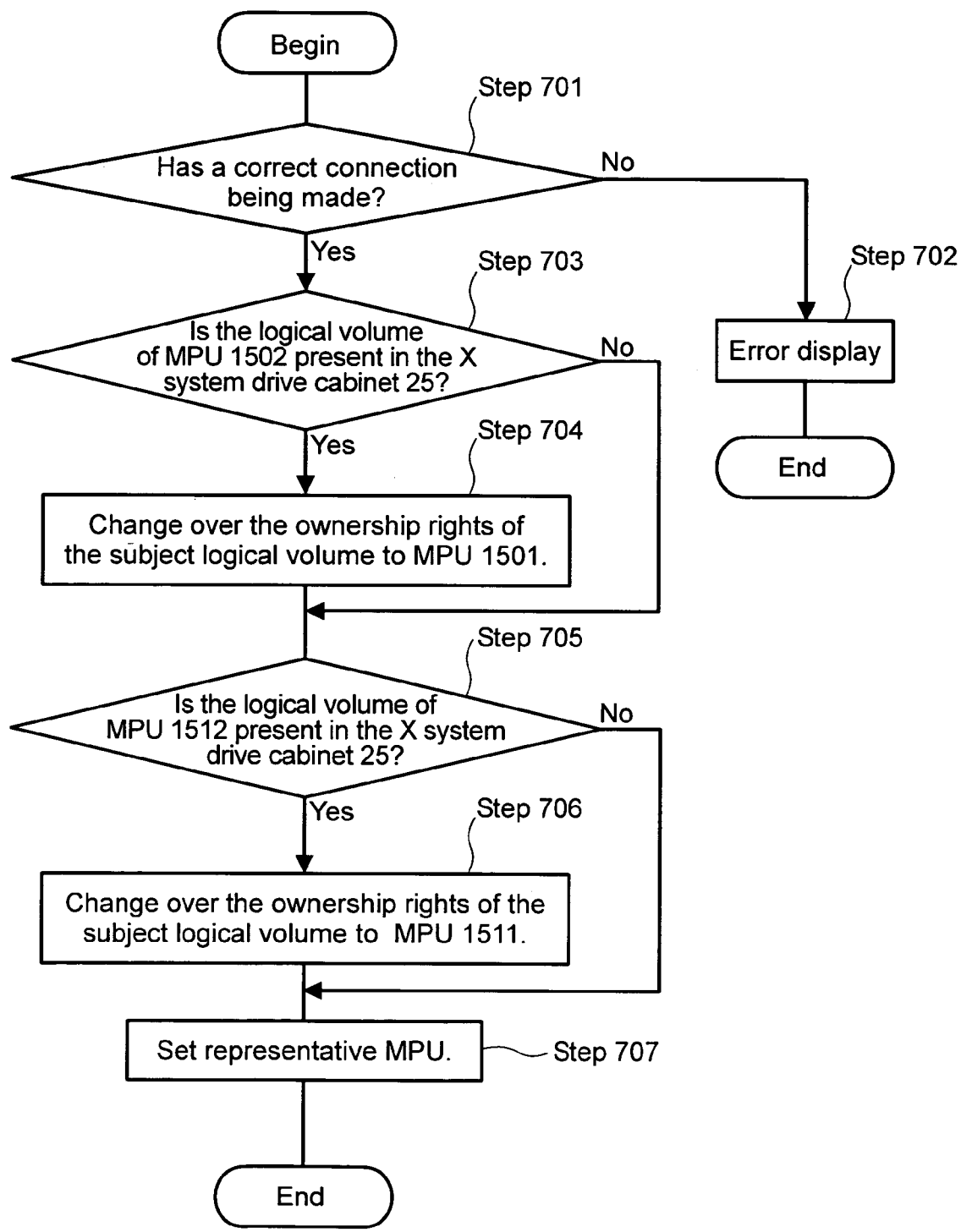
FIG. 7 is a process flow diagram showing an example of processing to effect change over to expanded bandwidth mode of the storage system 10 of the second embodiment.

The processing involved in changeover of the storage system 10 to the expanded bandwidth mode will now be described with reference to FIG. 7. FIG. 7 is a flow diagram showing the flow of processing involved in changeover of the storage system 10 according to the second embodiment to the expanded bandwidth mode. In the following description, it will be assumed that the MPU 1501 was set as the representative MPU in the "standard mode" prior to changeover to the "expanded bandwidth mode".

When the storage system 10 receives instructions to change over to the "expanded bandwidth mode" from the management terminal 3, each MPU ascertains through the subordinate IFs 1201, 1202, 1211 and 1212 whether or not the back-end loops 21, 22, 23 and 24 are connected normally (step 701). In this case, it will be assumed that when the MPU 1501 that has been set as the representative MPU receives instructions to change over to expanded bandwidth mode from the management terminal 3, it notifies the other MPUs (MPUs 1502, 1511 and 1512) to that effect.

However, if the storage system 10 finds that the back-end loops 21, 22, 23, 24 are not connected normally, processing advances to step 702; and, when the back-end loops are connected normally, processing advances to step 703.

In step 702, the storage system 10 terminates the processing by displaying a connection error at the management terminal 3. Specifically, if the MPU 1501 of the storage system 10 ascertains that there is an error in the connection of the back-end loop 21 for which the MPU 1501 is itself responsible, the MPU 1501 causes a connection error to be displayed on the management terminal 3. Also, when the MPU 1501 receives notification of a connection error from another MPU (MPU 1502, 1511 or 1512), it causes a connection error to be displayed on the management terminal 3.

On the other hand, if all of the MPUs conclude that the back-end loops 21, 22, 23 and 24 are connected normally, processing advances to step 703. The processing of step 703 will now be described.

In step 703, the MPU 1501 references the shared management information 14000 of the cache 140 to ascertain whether or not there is a logical volume to which the MPU 1502 has ownership rights, in the disks 2 that are classified in system X (the disk devices 2 of the X system drive cabinet 25). This is because the MPU 1502 cannot access the X system drive cabinet 25, so that the ownership rights must be changed over to the MPU 1501. If no logical volume to which the MPU 1502 has ownership rights exists, the MPU 1501 advances to step 705. However, if a logical volume exists to which the MPU 1502 does have ownership rights, the MPU 1501 advances step 704.

In step 704, the MPU 1501 changes over the ownership rights of the logical volume to which the MPU 1502 has ownership rights to the MPU 1501. Specifically, the MPU 1501 rewrites the ownership rights data in the shared management information of the cache 140.

In step 705, the MPU 1501 checks to ascertain whether or not there exists a logical volume to which the MPU 1512 has ownership rights in the X system drive cabinet 25. If none exists, the processing advances to step 707. On the other hand, if a logical volume to which the MPU 1512 does have ownership rights exists, the MPU 1501 advances to step 706.

In step 706, the MPU 1501 changes over the ownership rights of the logical volume to which the MPU 1512 has ownership rights to the MPU 1511.

Next, setting of the representative MPU for performing an operation in the expanded bandwidth mode is effected. In this example, the MPU 1501 sets the MPU 1501 as the representative MPU that performs management of the X system drive cabinet 25. Also, the MPU 1501 sets the MPU 1502 as the representative MPU that performs management of the Y system drive cabinet 26. These representative MPUs commence management in "expanded bandwidth mode" and perform periodic back-end monitoring.

It should be noted that, in the above description of the second embodiment, although it was assumed that, first of all, the connection of the back ends was altered and then the ownership rights were changed over, it would be possible to first of all change over the ownership rights to prepare for the expanded bandwidth mode and, thereafter, to alter the back-end connections.

In this way, the bandwidth of the back ends can be selected in accordance with the required environment, since, in the second embodiment, it is possible to implement changeover of the back end bandwidth.

<Third Embodiment>

Next, a third embodiment of the present invention will be described. In the third embodiment, the cache and data transfer control section that are provided by the controller 100 of the storage system 10 of the first embodiment are arranged to be independently provided for each IO processing system. In the description of the third embodiment, items that are the same as those described in the case of the first embodiment are given the same reference symbols.

Figure 8:
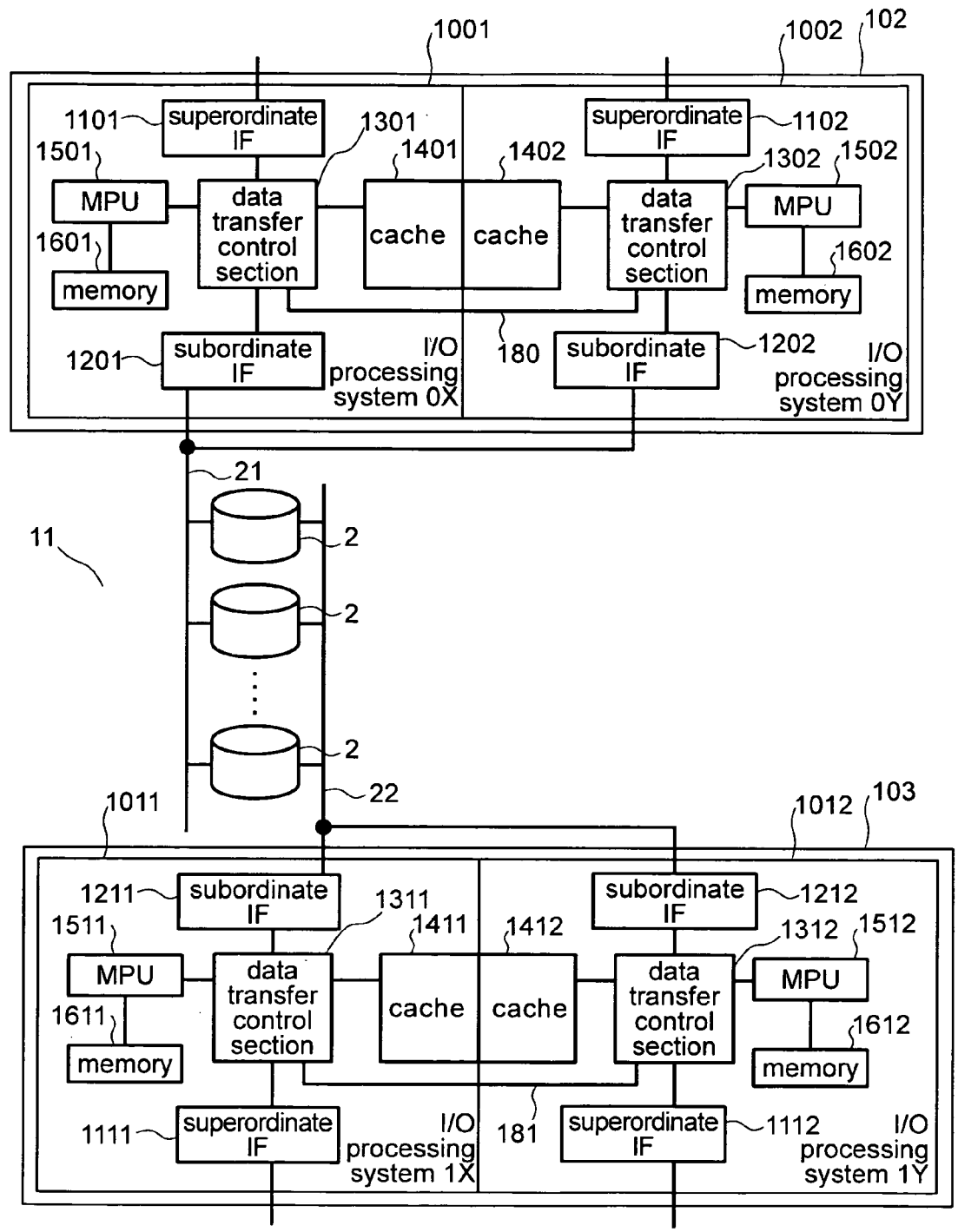
FIG. 8 is a diagrammatic view showing an example of a storage system according to a third embodiment of the present invention.

FIG. 8 is a diagram of a storage system according to the third embodiment of the present invention.

As shown in FIG. 8, the storage system 11 comprises controllers 102 and 103 that control the storage system 10, at least one or more disk devices 2 that store data from a host computer, which is not shown, and loops (back-end loops) 21, 22 that perform transfer of data and connect the controllers 102, 103 and the disk devices 2.

It should be noted that the construction of the disk devices 2 and the back-end loops 21, 22 is the same as that described in connection with the first embodiment described above. The MPUs, superordinate IFs, subordinate IFs and memories possessed by the controllers 102 (103) are the same as in the case of the controllers 100 (101) of the first embodiment. The following description will concentrate on the items that are different.

As shown in FIG. 8, the controller 102 comprises an IO processing system 0X 1001 and IO processing system 0Y 1002. The IO processing system 0X 1001 (IO processing system 0Y 1002) is constructed in modular form and is detachable from the controller 102. Specifically, the IO processing system 0X 1001 (IO processing system 0Y 1002) of the controller 102 comprises a superordinate IF 1101 (1102), a subordinate IF 1201 (1202), MPU 1501 (1502), a memory 1601 (1602), a data transfer control section 1301 (1302) and a cache 1401 (1402).

Thus, in the third embodiment, the IO processing system 0X 1001 (IO processing system 0Y 1002) does not share the hardware resources in the controller 102 with another IO processing system; and, with the storage system according to the third embodiment, addition and deletion of IO processing functions can therefore easily be performed in IO processing system units.

Also, the data transfer control section 1301 and the data transfer control section 1302 are connected by a dedicated circuit so that they can access each other's cache. By adopting such an arrangement, the data transfer control section 1301 can perform read/write processing of data on the cache 1402. Likewise, the data transfer control section 1302 can perform read/write processing of data on the cache 1401. It should be noted that any desired number of IO processing systems could be employed, so long as they can access the same cache.

The controller 103 comprises an IO processing system 1X 1011 and an IO processing system 1Y 1012. Also, the controller 103, like the controller 102, comprises a superordinate IF, a subordinate IF, a MPU, a memory, a data transfer control section and a cache for each IO processing system.

Also, in the storage system 11 according to the third embodiment, in the same way as in the first embodiment described above, as a protection against failure of one of the controllers, identical data is stored in the cache 1401 and the cache 1411. Identical data is also stored in the cache 1402 and in the cache 1412.

Specifically, the data transfer control section 1301 of the controller 102 and the data transfer control section 1311 of the controller 103 are connected by means of a dedicated circuit (not shown). Also, the data transfer control section 1302 of the controller 102 and the data transfer control section 1312 of the controller 103 are connected by means of a dedicated circuit (not shown).

Thus, when the data transfer control section 1301 (1311) writes data to the cache 1401 (1411), the same data is also written to the cache 1411 (1401). Also, when the data transfer control section 1302 (1312) writes data to the cache 1402 (1412), the same data is written to the cache 1412 (1402). By use of such an arrangement, the data of the cache 1401 and 1411 can be made to be identical. Also, the data of the cache 1402 and 1412 can be made to be identical.

Consequently, for example, data that was written to the cache 1402 from the IO processing system 0X 1001 is reflected also to the cache 1412.

Next, the structure of the cache of the third embodiment will be described. FIGS. 9(*a*) and 9(*b*) illustrate the structure of the cache of the third embodiment of the present invention.

FIG. 9(*a*) shows the cache 1401 that stores data relating to the IO processing system 0X, and FIG. 9(*b*) shows the cache 1402 that stores data relating to the IO processing system 0Y. In this way, by storing data relating to the IO processing system 0X in the cache 1401 and data relating to the IO processing system 0Y in the cache 1402, it is possible to cope with failure or insertion or removal of one of the IO processing systems. It should be noted that, as described above, the same data is stored in the cache 1411 and in the cache 1401. Also, the same data is stored in the cache 1412 and the cache 1402.

As shown in FIGS. 9(*a*) and 9(*b*), the cache 1401 is divided into regions 14000, 140001, 14002, 14005, and 14006. The cache 1402 is divided into regions 14000, 14003, 14004, 14007 and 14008. Also, the data stored in the above-described regions corresponds to data stored in the regions 14000 to 14008 shown in FIG. 4.

Specifically, in the region 14000, the shared management information that was described with reference to FIG. 4 is stored. The regions 14001, 14002, 14003, and 14004 store cache management information indicating the data storage information on the caches 1401 and 1402. The regions 14005, 14006, 14007 and 14008 store data that is exchanged with the host computer.

In this way, if a fourfold-mirrored structure of the shared management information is set up by combining the two controllers, even if a fault occurs in either system, the shared management information can be accessed from IO processing systems in the same controller in which no fault has occurred, so that the operation can be continued.

Figure 10:
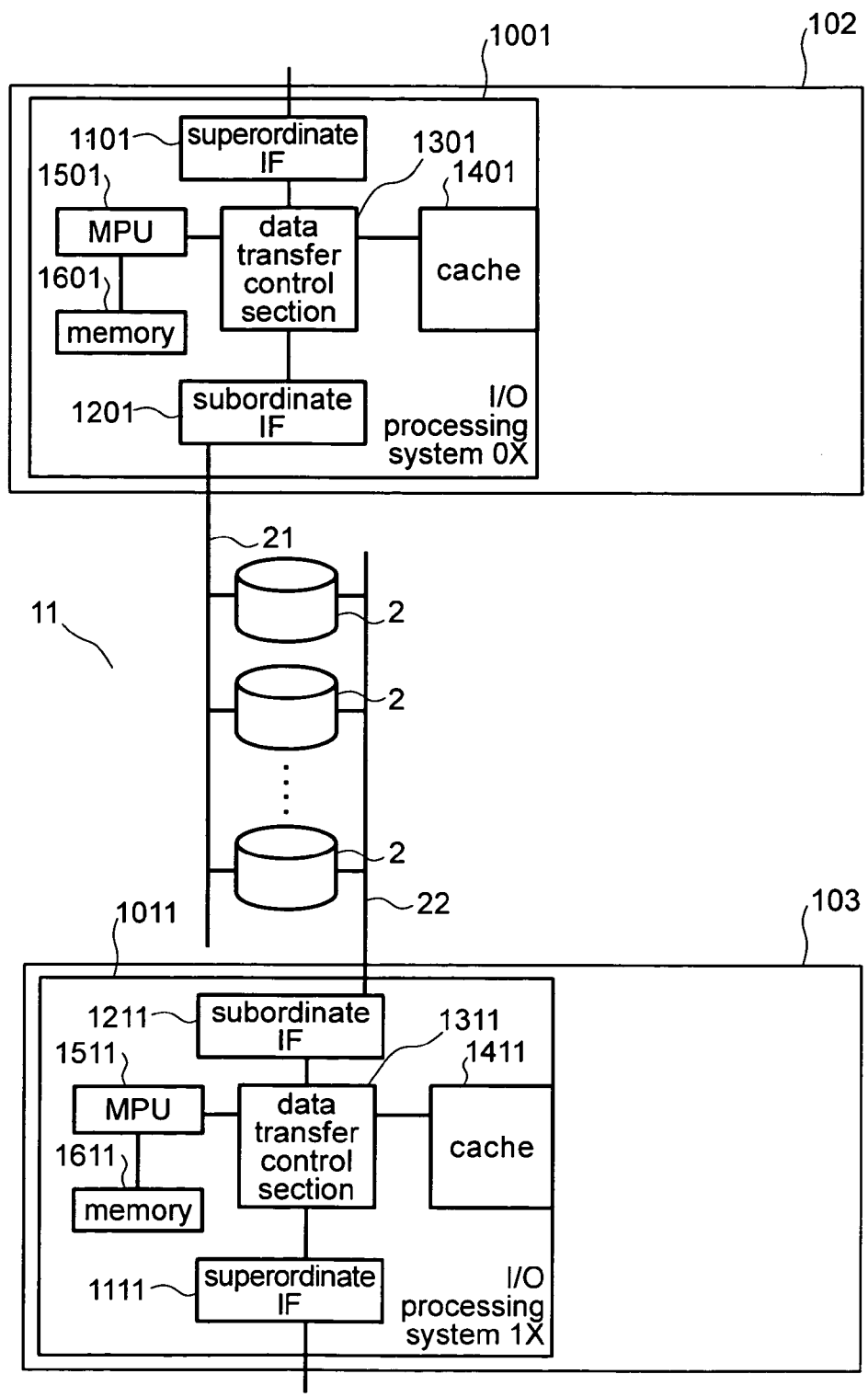
FIG. 10 is a diagrammatic view showing the condition in which a storage system according to the third embodiment is constituted by a single IO processing system.

Next, an example of a condition in which the storage system is constituted solely by the X IO processing system in the third embodiment will be described. FIG. 10 is a view showing the condition in which the storage system of the third embodiment of the present invention is constituted solely by the X IO processing system.

The illustrated example shows a condition in which the Y IO processing system of the controllers 102 and 103 has been removed. From the condition illustrated, the user can then expand the system to the functionality of the storage system 11 shown in FIG. 8 by respectively inserting the IO processing system 0Y 1002 and IO processing system 1Y 1012 in the controllers 102 and 103.

When the IO processing system 0Y 1002 and the IO processing system 1Y 1012 are inserted, the storage system 11 performs processing to effect sharing of the shared management information. Specifically, the storage system 11 performs copying processing in which the shared management information of the regions 14000 of the caches 1401, 1411 is copied to the regions 14000 of the caches 1402, 1412 of the inserted IO processing system 0Y 1002 and IO processing system 1Y 1012.

The MPU 1502 (1512) of the inserted IO processing system 0Y 1002 (1012) then initiates IO processing by copying the necessary information from the shared management information of the region 14000 to the memory 1602 (1612).

<Fourth Embodiment>

Next, a fourth embodiment of the present invention will be described. In the fourth embodiment, a construction is added to the storage system 10 of the third embodiment that expands the bandwidth of the back-end loops of the second embodiment. Items that are the same as those described in connection with the first embodiment are given the same reference symbols in the description of the fourth embodiment.

Figure 11:
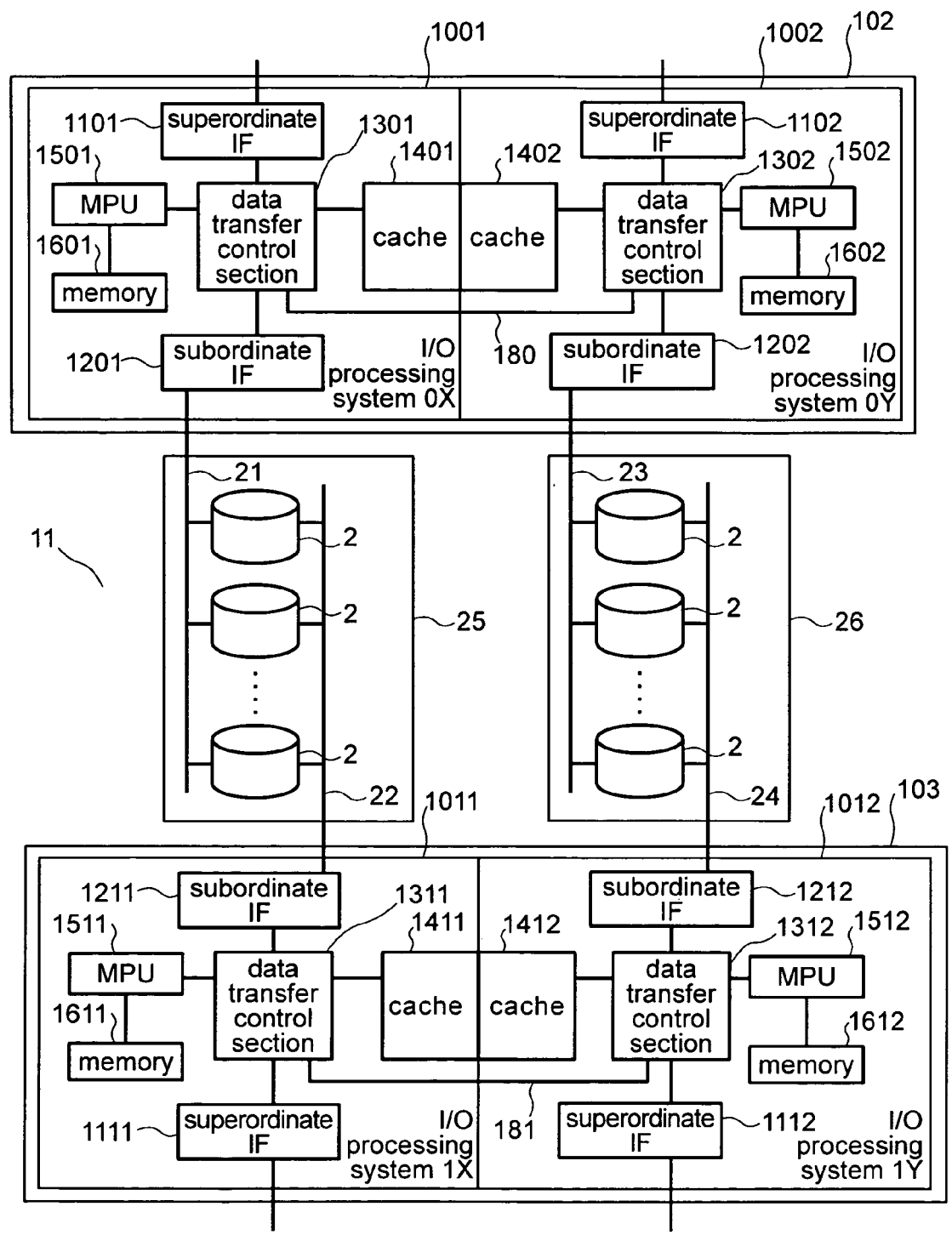
FIG. 11 is a diagram showing an example of a storage system according to a fourth embodiment of the present invention.

FIG. 11 is a diagram of a storage system according to the fourth embodiment of the present invention.

The controllers 102, 103 that are illustrated here have the same construction as those described with reference to FIG. 8 above. The construction of the X system drive cabinet 25 and Y system drive cabinet 26 are the same as the constructions described with reference to FIG. 6 above.

The subordinate IF 1201 of the X system of the IO processing system of the controller 102 is connected with the back-end loop 21 that connects a disk device 2 that is accommodated in the X system drive cabinet 25. The subordinate IF 1211 of the X system of the IO processing system of the controller 103 is connected with the back-end loop 22 that connects a disk device 2 that is accommodated in the X system drive cabinet 25.

Also, the subordinate IF 1202 of the Y system of the IO processing system of the controller 102 is connected with the back-end loop 23 that connects a disk device 2 that is accommodated in the Y system drive cabinet 26. The subordinate IF 1212 of the Y system of the IO processing system of the controller 103 is connected with the back-end loop 24 that connects a disk device 2 that is accommodated in the Y system drive cabinet 26.

In this way, if "expanded bandwidth mode" is set, there are then a total of four back ends of the storage system 11 i.e. the loop bandwidth is expanded compared with the "standard mode".

Also, in the fourth embodiment, a representative MPU is set for each respective IO processing system. For example, the MPU 1501 is set to implement management in respect of disk devices 2 in the X system drive cabinet 25. The MPU 1502 is set to implement management in respect of disk devices 2 in the Y system drive cabinet 26.

It should be noted that changeover from the "standard mode" to the "expanded bandwidth mode" of the fourth embodiment can be effected by the same method as that employed in the case of the second embodiment described above. Also, in the fourth embodiment, it is possible to expand the configuration of the "single IO processing system" of the third embodiment shown in FIG. 10 to change over to the expanded "expanded bandwidth mode". Also, if the structure is constituted as in the fourth embodiment, the user can also set this to a structure, for example, as shown in FIG. 8, FIG. 10 or FIG. 11.

In this way, in the third and fourth embodiments of the present invention, in addition to the meritorious effects of the first and second embodiments, expansion can be effected in IO processing system units, so that the ability to upgrade the performance of the storage system can be increased.

The present invention is not restricted to the embodiments described above and could be modified in various ways within the scope of the gist of the present invention. For example, in the embodiments described above, while the case was described in which the controllers of the storage system were duplicated, there is no particular restriction to this. A storage system could be employed that is provided with only a single controller.

Also, according to the present invention, it would be possible to employ a single device in different ways for different tasks, with database use being in standard mode but streaming being performed to deal with a host computer-side application in, for example, the expanded bandwidth mode.

What is claimed is:

1. A storage system comprising:
   a plurality of disks; and
   a disk controller receiving a request from a computer and controlling input/output processing to/from said disks,
   wherein said disk controller comprises:
   a plurality of processors,
   a plurality of memories each of which stores an operating program of the storage system,
   a plurality of first interfaces each of which controls input/output processing from/to said computer,
   a plurality of second interfaces each of which controls input/output processing to/from a disk,
   a cache memory that stores data for exchange with said computer and that is employed in shared manner by said plurality of processors, and
   a data transfer control section that controls transfer of data stored in the cache memory in accordance with requests from each of said plurality of processors,
   wherein each of said memories, each of said first interfaces, and each of said second interfaces are provided for exclusive use by each of the processors,
   wherein said cache memory further stores common management information which includes system information of said storage system, configuration information of logical volumes formed on said disks and ownership right information indicating which of the processors are responsible for which of the logical volumes and cache management information corresponding to each processor to permit said processor to manage at least a portion of said cache memory, and
   wherein each of said processors accesses the memory and the portion of the cache memory dedicated for its exclusive use to execute the operating program stored in the memory and controls the first interface and second interface dedicated for its exclusive use to perform input/output processing requested from said computer based on said common management information and said cache management information stored in the cache memory.

2. A storage system comprising:
   a plurality of disks; and
   a plurality of disk controllers each of which receives a request from a computer and controls input/output to/from a disk,
   wherein each of said plurality of disk controllers comprises:
   a plurality of input/output processing sections, each of which comprises a memory storing an operating program of the storage system, a first interface controlling data input/output from/to said computer, a second interface controlling data input/output to/from a disk, a processor executing said operating program to control said first interface and said second interface for executing a request from said computer,
   a cache memory shared between said plurality of input/output processing sections, and
   a data transfer control section controlling data transfer from said cache memory according to a request from each input/output processing section,
   wherein said cache memory further stores common management information which includes system information of said storage system, configuration information of logical volumes formed on said disks and ownership right information indicating which of the processors are responsible for which of the logical volumes and cache management information corresponding to each processor to permit said processor to manage at least a portion of said cache memory, and
   wherein each of processor accesses the memory and the portion of the cache memory dedicated for its exclusive use to execute the operating program stored in the memory and controls the first interface and second interface dedicated for its exclusive use to perform input/output processing requested from said computer based on said common management information and said cache management information stored in the cache memory.

3. The storage system according to claim 2, wherein each input/output processing section in a disk controller is coupled to said disks via a same access path.

4. The storage system according to claim 2, wherein each disk controller is arranged to be capable of being set in two modes including a first mode in which a plurality of input/output processing sections are connected with the same disk device and a second mode in which a plurality of input/output sections are respectively connected with different disk devices.

5. The storage system according to claim 2, wherein each input/output processing section, when writing data to a cache memory of the disk controller to which this input/output processing section itself belongs, writes data of the same content also to the cache memory of another disk controller.

6. A storage system comprising:
   a plurality of disks; and
   a disk controller receiving and executing a request from a computer with respect to said disks,
   wherein said disk controller comprises a plurality of input/output processing modules, and each of said input/output processing module comprises:
   a memory that stores an operating program of the storage system,
   a first interface that controls the input/output of data to/from said computer,
   a second interface that controls the input/output of data to/from said disks,
   a cache memory that stores data for exchange with said computer and data representing the layout of said disks,
   a data transfer control section that controls transfer of data stored in said cache memory, and
   a processor that performs input/output processing requested by said computer by executing said operating program and controlling said first interface, said second interface, and said transfer control section,
   wherein each of said input/output processing modules is constituted so as to be capable of being detached from said disk controller,
   wherein said cache memory further stores common management information which includes system information of said storage system, configuration information of logical volumes formed on said disks and ownership right information indicating which of the processors are responsible for which of the logical volumes and cache management information corresponding to each processor to permit said processor to manage at least a portion of said cache memory, and
   wherein said processor accesses the memory and the portion of the cache memory dedicated for its exclusive use to execute the operating program stored in this memory and controls the first interface and second interface dedicated for its exclusive use to perform input/output processing requested from said computer based on said common management information and said cache management information stored in the cache memory.

7. The storage system according to claim 6, wherein said disk controller is arranged to be capable of being set in two modes including a first mode in which a plurality of input/output processing modules are connected with the same disk device and a second mode in which said plurality of input/output modules are respectively connected with different disk devices.

* * * * *